(12) United States Patent
Todd et al.

(10) Patent No.: US 6,311,773 B1
(45) Date of Patent: Nov. 6, 2001

(54) RESIN COMPOSITION AND METHODS OF CONSOLIDATING PARTICULATE SOLIDS IN WELLS WITH OR WITHOUT CLOSURE PRESSURE

(75) Inventors: Bradley L. Todd, Duncan; Billy F. Slabaugh, Marlow; Ronald J. Powell, Duncan, all of OK (US); Joseph G. Yaritz, Utica, KY (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/493,998

(22) Filed: Jan. 28, 2000

(51) Int. Cl.⁷ .................. E21B 33/138; E21B 43/267
(52) U.S. Cl. ................... 166/280; 166/281; 166/295; 507/219; 507/903; 507/924; 523/131
(58) Field of Search ..................... 166/276, 280, 166/281, 295, 300; 507/219, 903, 924; 523/131

(56) References Cited

U.S. PATENT DOCUMENTS

| | | | |
|---|---|---|---|
| 4,042,032 | 8/1977 | Anderson et al. | 166/276 |
| 4,070,865 | 1/1978 | McLaughlin | 166/293 |
| 4,074,760 | 2/1978 | Copeland et al. | 166/276 |
| 4,336,842 | 6/1982 | Graham et al. | 166/276 |
| 4,829,100 | 5/1989 | Murphey et al. | 523/131 |
| 5,128,390 | 7/1992 | Murphey et al. | 523/130 |
| 5,381,864 | 1/1995 | Nguyen et al. | 166/280 |
| 5,393,810 | * 2/1995 | Harris et al. | 523/131 X |
| 5,609,207 | * 3/1997 | Dewprashad et al. | 166/276 |
| 5,839,510 | * 11/1998 | Weaver et al. | 166/276 |
| 5,921,317 | * 7/1999 | Dewprashad et al. | 166/280 |
| 5,924,488 | * 7/1999 | Nguyen et al. | 166/280 |
| 5,960,880 | * 10/1999 | Nguyen et al. | 166/281 X |
| 6,003,600 | * 12/1999 | Nguyen et al. | 166/281 |
| 6,016,870 | * 1/2000 | Dewprashad et al. | 166/295 |

OTHER PUBLICATIONS

S. W. Almond et al., "Factors Affecting Proppant Flowback With Resin Coated Proppants," SPE 30096 (1995 European Formation Damage Conference, May 15–16, 1995).

* cited by examiner

Primary Examiner—George Suchfield
(74) Attorney, Agent, or Firm—Robert A. Kent; C. Clark Dougherty, Jr.

(57) ABSTRACT

Improved hardenable resin compositions and methods of consolidating particulate solids in subterranean zones penetrated by well bores are provided. The improved hardenable resin compositions of the invention are basically comprised of a hardenable organic resin, an aminosilane resin-to-particulate solid coupling agent, a viscous carrier fluid breaker for breaking separating films of viscous carrier fluid between resin coated particulate solids and a surface active agent for causing the resin composition to flow to the contact points between resin coated particulate solids.

20 Claims, No Drawings ns with or without closure pressure exerted thereon or when the particulate solids are separated by films of an unbroken viscous carrier fluid in the zone, or both.

RESIN COMPOSITION AND METHODS OF CONSOLIDATING PARTICULATE SOLIDS IN WELLS WITH OR WITHOUT CLOSURE PRESSURE

BACKGROUND OF THE INVENTION

1. Field of the Invention

The present invention relates to improved hardenable resin compositions for consolidating particulate solids coated therewith and to methods of consolidating particulate solids in subterranean zones using the resin compositions.

2. Description of the Prior Art

Various resin compositions and methods have been developed for consolidating particulate solids such as sand into hard permeable packs in subterranean zones. The compositions and methods are useful in preventing loose or incompetent sand in subterranean formations from being produced from the formations along with formation fluids such as hydrocarbons and/or water. The consolidated particulate solid packs reduce or prevent the migration and production of sand with produced fluids when the packs are located between the producing formation and the well bore penetrating the formation.

A technique which has heretofore been utilized for consolidating loose or incompetent sand in a subterranean zone penetrated by a well bore comprises pumping a hardenable resin composition in a carrier fluid into the zone by way of the well bore whereby the loose or incompetent sands are coated with the resin composition and then causing the resin composition to harden whereby the loose or incompetent sands are consolidated into a hard permeable pack.

Another technique which has heretofore been utilized for forming a hard permeable particulate solid pack in a subterranean zone penetrated by a well bore comprises suspending the particulate solids in a viscous carrier fluid and coating the solids with a hardenable resin composition on the surface and then pumping the suspension by way of the well bore into the subterranean zone whereby the resin coated particulate solids are deposited therein. The hardenable resin composition on the deposited particulate solids is caused or permitted to harden whereby a consolidated permeable particulate solid pack is formed between the well bore and loose or incompetent sand in the formation.

Hydrocarbon producing wells are often stimulated by hydraulic fracturing treatments. In such hydraulic fracturing treatments, a viscous fracturing fluid which also functions as a carrier fluid is pumped into a producing zone to be fractured at a rate and pressure such that one or more fractures are formed in the zone. Particulate solids for propping the fractures, commonly referred to in the art as "proppant," are suspended in a portion of the fracturing fluid so that the particulate solids are deposited in the fractures when the fracturing fluid is broken, usually by a breaker composition included in the fracturing fluid, whereby the fracturing fluid reverts to a thin fluid and returns to the surface. The proppant functions to prevent the fractures from closing so that conductive channels are formed through which produced fluids can readily flow.

In order to prevent the subsequent flow-back of proppant as well as loose or incompetent sand in the fractured zone with fluids produced therefrom, at least a portion of the proppant has heretofore been coated with a hardenable resin composition which is caused to harden and consolidate the proppant in the zone. Typically, the resin composition coated proppant is deposited in the fracture after a larger quantity of uncoated proppant has been deposited therein. That is, the last portion of the proppant deposited in each fracture, referred to in the art as the "tail-end" portion, is coated with the hardenable resin composition. When the viscous fracturing fluid which is the carrier fluid for the proppant is broken and reverts to a thin fluid as described above, the resin coated proppant is deposited in the fractures and the fractures close on the proppant. The partially closed fractures apply pressure on the resin coated proppant whereby the proppant particles are forced into contact with each other while the resin composition hardens. The hardening of the resin composition under pressure brings about the consolidation of the resin coated proppant particles into a hard permeable pack having sufficient compressive strength to prevent unconsolidated proppant and formation sand from flowing out of the fractures with produced fluids.

In fracture treatments carried out in an unconsolidated formation, good consolidation of proppant is required in the perforations which extend from inside the well bore through casing and cement into the unconsolidated formation as well as in the fractured portions of the unconsolidated formation surrounding the well bore. That is, the tail-end portion of the proppant which is deposited in the perforations and in the fractures, is coated with a hardenable resin composition and caused to harden. The resulting consolidated proppant in the perforations and fractures contributes to the prevention of proppant flow-back. However, there is often little closure pressure applied to the resin coated proppant in the fractures in an unconsolidated formation and there is no closure pressure applied to the resin coated proppant in the perforations. As a result, the consolidated permeable packs formed in the perforations and fractures often have less than sufficient compressive strength to prevent unconsolidated proppant and formation sand from flowing out of the perforations and fractures.

The above problem is complicated when the viscous carrier fluid (the fracturing fluid) is a cross-linked gelled fluid containing a breaker which does not break for a relatively long period of time during which the resin composition coated on the proppant hardens. At high temperatures and particularly temperatures above about 200° F., resin compositions harden quickly and if the viscous carrier fluid has not broken, the resin coated particulate proppant particles are separated from each other by films of the viscous carrier fluid. As a result of the presence of the carrier fluid films, the proppant does not sufficiently consolidate and proppant flow-back occurs. Thus, when resin coated particulate solids are consolidated in subterranean zones where there is little or no closure pressure exerted on the resin coated particulate solids or when a carrier fluid used to carry resin coated particulate solids into a subterranean zone does not break before the resin hardens, or both, sufficient consolidation of the particulate solids often does not take place and proppant flow-back occurs.

Thus, there are needs for improved hardenable resin compositions and methods for consolidating particulate solids coated with the resin compositions in subterranean zones which produce good consolidations with or without closure pressure exerted thereon or when the particulate solids are separated by films of an unbroken viscous carrier fluid in the zone, or both.

SUMMARY OF THE INVENTION

The present invention provides improved resin compositions and methods of consolidating particulate solids coated with the compositions which meet the needs described above and overcome the deficiencies of the prior art. The improved hardenable resin compositions of this invention are basically comprised of a hardenable organic resin, an aminosilane resin-to-particulate solid coupling agent, a viscous carrier fluid temperature activated breaker for converting separating films of viscous carrier fluid between adjacent resin coated particulate solids to thin fluids whereby the resin coated particulate solids contact each other and a surface active agent for causing the resin to flow to the contact points between adjacent resin coated particulate solids.

The methods of the present invention for consolidating particulate solids in a subterranean zone penetrated by a well bore regardless of the lack of closure pressure exerted on the particulate solids in the zone or when the particulate solids are separated by films of an unbroken viscous carrier fluid in the zone, or both, are basically comprised of the following steps. A hardenable resin composition is prepared comprised of a hardenable organic resin, an aminosilane resin-to-particulate solid coupling agent, a temperature activated viscous carrier fluid breaker for breaking the carrier fluid films and a surface active agent for causing the resin composition to flow to contact points between the particulate solids. Thereafter, the particulate solids are coated with the hardenable resin composition, and the resin composition is allowed to harden and consolidate the particulate solids into a hard permeable pack in the zone.

The resin composition can include a heat activated organic resin, i.e., an organic resin that hardens after being heated to the temperature of the subterranean zone in which it is placed. Alternatively, the resin composition can be caused to harden by contact with an external hardening agent or by an internal hardening agent included in the composition.

It is, therefore, a general object of the present invention to provide improved hardenable resin compositions for consolidating particulate solids coated therewith and methods of using the resin compositions for consolidating particulate solids in subterranean zones.

Other and further objects, features and advantages of the present invention will be readily apparent to those skilled in the art upon a reading of the description of preferred embodiments which follows.

DESCRIPTION OF PREFERRED EMBODIMENTS

As mentioned above, when particulate solids in a subterranean zone are coated with a resin composition in situ or when resin coated particulate solids are introduced into a subterranean zone, if there is a lack of fracture closure pressure exerted on the resin coated particulate solids in the zone, or if the resin coated particulate solids are separated by films of unbroken viscous carrier fluid in the zone, or both, the resin compositions utilized heretofore often do not consolidate the particulate solids into hard permeable packs having sufficient compressive strength to prevent particulate solid flow-back with produced fluids.

When resin coated particulate solids are deposited in a fracture which closes on the resin coated solid particles, the particles are forced together so that they contact one another and are consolidated into a hard permeable pack when the resin hardens. However, when the resin coated particulate solids are in zones which do not apply closure pressure on the particulate solids, the compressive strength of the resulting consolidated pack is often low whereby the pack can fail and allow particulate solid flow-back. This problem is made more severe when resin coated particulate solids are placed in a zone without closure pressure at relatively high temperatures by a hard to break viscous carrier fluid, e.g., a gelled and cross-linked aqueous carrier fluid. If the viscous carrier fluid does not quickly break into a thin fluid, the resin coated particulate solids are separated by films of the unbroken viscous carrier fluid which prevent the resin coated particles from contacting during the short time in which the resin hardens and the particulate solids are not consolidated.

The present invention provides improved resin compositions which include a viscous carrier fluid breaker for breaking separating films of viscous carrier fluid between adjacent resin coated particulate solids to thin fluids after the resin coated particulate solids are placed in a subterranean zone whereby the resin coated particulate solids contact each other before the resin hardens. In addition, the resin compositions of this invention include a surface active agent for causing the resin on the solid particles to more readily flow to the contact points between the particles which brings about consolidations of high compressive strengths. Thus, the improved hardenable resin compositions of this invention for consolidating particulate solids coated therewith function successfully, i.e., produce consolidations having high compressive strengths, in applications with or without closure pressure exerted on the resin coated solids or in applications where the particulate solids are separated by films of an unbroken viscous carrier fluid in the zone, or both.

The improved hardenable resin compositions for consolidating particulate solids coated therewith in a subterranean zone are basically comprised of a hardenable organic resin, an aminosilane resin-to-particulate solid coupling agent, a viscous carrier fluid breaker, preferably a temperature activated breaker, for converting separating films of viscous carrier fluid between adjacent resin coated particulate solids to thin fluids whereby the resin coated particulate solids contact each other and a surface active agent for causing the resin composition to flow to the contact points between adjacent resin coated particulate solids.

The hardenable organic resin used is preferably a liquid at 80° F. and can be cured or hardened by being heated in the subterranean zone in which it is placed or by contact with an external or internal hardening agent. Examples of hardenable organic resins which are suitable for use in accordance with this invention are polyepoxide resins, novolak resins, polyester resins, phenol-aldehyde resins, urea-aldehyde resins, furan resins, urethane resins and mixtures of such resins. The resins are available at various viscosities, depending upon the molecular weights of the resins. The preferred viscosity of the organic resin used in accordance with this invention is in the range of from about 500 to about 2500 centipoises at 80° F. However, as will be understood, resins of higher viscosities can be utilized when mixed or blended with one or more diluents.

When an external hardening agent is utilized, it is brought into contact with the hardenable resin composition after the resin composition has coated the particulate solids to be consolidated and the particulate solids are in the subterranean zone. Typically, the external hardening agent is placed in an overflush solution which is pumped into the zone containing the resin coated particulate solids to be consolidated. Examples of external hardening agents include, but are not limited to, benzotrichloride, acetic acid, formic acid and inorganic acids such as hydrochloric acid. Generally, external hardening agents selected from the group of inorganic acids, organic acids and acid producing chemicals are preferred.

When an internal hardening agent is utilized, a particular hardening agent is selected that causes the resin composition to harden after a period of time sufficient for the resin composition to be placed in the subterranean zone to be treated. Retarders or accelerators to lengthen or shorten the cure times can also be utilized.

Suitable internal hardening agents for hardening resin compositions containing polyepoxide resins include, but are not limited to, amines and amides. Preferred such internal hardening agents are 2-ethyl, 4-methyl imidazole and 4,4'-diaminodiphenylsulfone. Examples of internal hardening agents which can be used with resin compositions containing furan resins, phenol-aldehyde resins, urea-aldehyde resins and the like are hexachloroacetone, 1,1,3-trichlorotrifluoroacetone, benzotrichloride, benzylchloride and benzalchloride.

The hardenable organic resin utilized is preferably included in the resin compositions of this invention in an amount in the range of from about 40% to about 80% by weight of the compositions, more preferably in an amount in the range of from about 60% to about 75% and most preferably in an amount of about 60%. When used, an internal hardening agent for hardening the organic resin is preferably included in the resin compositions of this invention in an amount in the range of from about 10% to about 50% by weight of the compositions, more preferably in an amount of about 20% to about 30% and most preferably in an amount of about 20%.

The aminosilane resin-to-particulate solid coupling agent can be one or more of a variety of aminosilanes. Examples of such silanes include, but are not limited to, 3-aminopropyltrimethoxysilane, N-2-(aminoethyl)-3-aminopropyltrimethoxysilane and 3-glycidoxypropyltrimethoxysilane. Of these, 3-glycidoxypropyltrimethoxysilane is preferred. The aminosilane coupling agent used is preferably included in the resin compositions of this invention in an amount in the range of from about 0% to about 5% by weight of the compositions, more preferably in an amount in the range of from about 2% to about 3% and most preferably in an amount of about 2%.

While a variety of viscous carrier fluid breakers which are well known to those skilled in the art can be used in the resin composition, such as, oxidative breakers such as organic peroxides, alkali metal persulfates and chlorites, delayed release acids and enzymes, a temperature activated breaker that is activated at a temperature in the range of from about 160° F. to about 270° F. is preferred. A breaker which can complex with the crosslinking agent to reduce the crosslinked viscosity of the gelled carrier fluid is particularly preferred. Examples of such breakers include, but are not limited to, hydrolyzable esters such as sorbitol, catechol, dimethyl glutarate dissolved in methanol, dimethyl glutarate dissolved in butyl alcohol or a mixture of dimethyl glutarate, dimethyl succinate and dimethyl adipate. The temperature activated breaker utilized is activated when the resin composition is heated by the subterranean zone into which the resin composition is placed to the activation temperature of the breaker and the breaker functions to break separating films of viscous carrier fluid between adjacent resin coated particulate solids to thin fluids whereby the resin coated particulate solids contact each other before the resin hardens. The breaker utilized, preferably dimethyl glutarate dissolved in butyl alcohol, is preferably included in the resin composition of this invention in an amount in the range of from about 1% to about 12% by weight of the composition, more preferably in the range of from about 1% to about 4% and most preferably in an amount of about 1.2%.

A variety of surface active agents can be utilized in the resin compositions of this invention. A preferred surface active agent is an ethoxylated nonyl phenol phosphate ester.

Another preferred surface active agent is a mixture of one or more cationic surface active agents and one or more non-cationic surface active agents. As used herein, a non-cationic surface active agent includes a blend of anionic and non-ionic surface active agents.

The cationic surface active agents useful herein are preferably the reaction product of an alcohol, epichlorohydrin and triethylenediamine wherein monohydric aliphatic alcohols having in the range of from about 12 to about 18 carbon atoms are reacted with from 2 to 3 moles of epichlorohydrin per mole of alcohol followed by reaction with an excess of triethylenediamine. The alcohol epichlorohydrin reaction product contains an ethoxylation chain having pendent chlorides. The subsequent reaction with triethylenediamine provides a cationic and a tertiary amine functionality to the resulting surfactant product.

The non-cationic surfactants are preferably ethoxylated fatty acids produced by reacting fatty acids containing from about 12 to about 22 carbon atoms with from about 5 to about 20 moles of ethylene oxide per mole of acid, most preferably from about 12 to about 18 moles of ethylene oxide per mole of acid, to produce a mixture of various quantities of ethoxylated acids and unreacted acids.

When the gelling agent used is a cellulose derivative, then one preferred surface active agent is a blend comprised of isopropyl alcohol, the cationic agent described above and the non-cationic agent described above, wherein the weight ratio of cationic agent to non-cationic agent in the blend is in the range of about 0.4 to 1, and preferably about 0.6, parts by weight cationic agent per 1 part by weight non-cationic agent and wherein the weight ratio of isopropyl alcohol to non-cationic agent in the blend is about 1 party by weight alcohol per 1 part by weight non-cationic agent.

When the gelling agent used herein is a galactomannan gum, then one preferred surface active agent is a blend comprised of amyl alcohol, the cationic agent described above and the non-cationic agent described above wherein the weight ratio of cationic agent to non-cationic agent in the blend is in the range of about 0 to 1, and preferably about 0.2, parts by weight cationic agent per 1 part by weight non-cationic agent and wherein the weight ratio of amyl alcohol to non-cationic agent in the blend is about 1 part by weight alcohol per 1 part by weight non-cationic agent.

The alcohol constituent of the above described blends functions as a solubilizer and diluent for the cationic and non-cationic surfactants. Appropriate substitutes for amyl alcohol include other similar alcohols, for example isopropyl alcohol, n-hexanol and fusel oil.

As mentioned, the surface active agent functions to cause resin to flow to the contact points between adjacent resin coated particulate solids so that the solids are consolidated into a high strength permeable mass. The surface active agent utilized is preferably included in the hardenable resin compositions of this invention in an amount in the range of from about 1% to about 10% by weight of the compositions, more preferably in an amount in the range of from about 6% to about 8% and most preferably in an amount of about 6%.

A particularly preferred improved hardenable resin composition of this invention is comprised of a polyepoxide resin, e.g., a condensation product of epichlorohydrin and bisphenol A present in an amount of about 60% by weight of the composition; an amine hardening agent, e.g., diethyltoluenediamine present in an amount of about 20% by weight of the composition; N-2-(aminoethyl)-3-aminopropyltrimethoxysilane present in an amount of about 2% by weight of the composition; a viscous carrier fluid temperature activated breaker comprised of dimethyl glutarate dissolved in butyl alcohol present in an amount of about 1.2% by weight of the composition; and an ethoxylated nonyl phenol phosphate ester surfactant present in an amount of about 6% by weight of the composition.

A variety of carrier fluids or fracturing fluids can be utilized in accordance with the present invention including aqueous gels, foams or emulsions. The term "carrier fluid" is used herein to mean liquids, emulsions, foams or other fluids utilized for carrying particulate solids including fracture proppant into a subterranean zone penetrated by a well bore. The foams are generally comprised of water, one or more foaming agents and a gas such as nitrogen or air. The emulsions can be comprised of two immiscible liquids or a liquid such as water and a liquified, normally gaseous fluid, such as carbon dioxide.

The preferred carrier fluids for use in accordance with this invention as carrier fluids and fracture fluids are aqueous gels comprised of water, a gelling agent for gelling the water and increasing its viscosity, and optionally, a cross-linking agent for cross-linking the gel and further increasing the viscosity of the fluid. The increased viscosity of the gelled or gelled and cross-linked fluid reduces fluid loss and allows the fluid to transport significant quantities of suspended particulate solids. The water utilized to form the carrier fluid can be fresh water, salt water, brine or any other aqueous liquid which does not adversely react with other components utilized in accordance with this invention.

A variety of gelling agents can be utilized including hydratable polymers which contain one or more functional groups such as hydroxyl, cis-hydroxyl, carboxyl, sulfate, sulfonate, amino or amide. Particularly useful such polymers are polysaccharides and derivatives thereof which contain one or more of the monosaccharide units galactose, mannose, glucoside, glucose, xylose, arabinose, fructose, glucuronic acid or pyranosyl sulfate. Examples of natural hydratable polymers containing the foregoing functional groups and units which are particularly useful in accordance with the present invention include guar gum and derivatives thereof such as hydroxypropyl guar and cellulose derivatives such as hydroxyethyl cellulose. Hydratable synthetic polymers and copolymers which contain the above mentioned functional groups can also be utilized. Examples of such synthetic polymers include, but are not limited to, polyacrylate, polymethacrylate, polyacrylamide, polyvinyl alcohol and polyvinylpyrrolidone. The gelling agent used is generally combined with water in an amount in the range of from about 0.1% to about 1% by weight of the water.

Examples of cross-linking agents which can be utilized to further increase the viscosity of a gelled carrier fluid are alkali metal borates, borax, boric acid and compounds which are capable of releasing multivalent metal ions in aqueous solutions. Examples of the multivalent metal ions are chromium, zirconium, antimony, titanium, iron, zinc or aluminum. When used, the cross-linking agent is generally added to the gelled water in an amount in the range of from about 0.01% to about 1% by weight of the water.

The above described gelled or gelled and cross-linked carrier liquids typically also include internal gel breakers such as those of the enzyme type, the oxidizing type, the acid buffer type and the temperature activated type, all of which are well known to those skilled in the art. The gel breakers cause the viscous carrier fluids to revert to thin fluids that can be produced back to the surface after they have been used to place particulate solids in a subterranean zone, e.g., to place hardenable resin composition coated particulate solids into fractures or other openings in subterranean zones including the perforations extending from the well bore into the zones. The carrier fluids can also include one or more of a variety of well known additives such as gel stabilizers, fluid loss control additives, clay stabilizers, bacteriacides and the like.

The particulate solids utilized in accordance with the present invention are generally of a size such that formation particulate solids which migrate with produced fluids are prevented from being produced from a subterranean zone along with hydrocarbons and/or water. Various kinds of particulate solids can be utilized including sand, bauxite, ceramic materials, glass materials and the like. Generally, the particulate solids have a particle size in the range of from about 2 to about 400 mesh, U.S. Sieve Series. The preferred particulate material is sand having a particle size in the range of from about 10 to about 70 mesh, U.S. Sieve Series. Preferred sand particle size distribution ranges are one or more of 10–20 mesh, 20–40 mesh, 40–60 mesh or 50–70 mesh, depending on the particular size and distribution of formation solids to be screened out by the particulate solid pack formed.

The methods of the present invention for consolidating particulate solids in a subterranean zone penetrated by a well bore produce permeable consolidated particulate solid packs of high compressive strengths when there is a lack of closure pressure exerted on the particulate solids in the zone or when the particulate solids are separated by films of unbroken viscous carrier fluid in the zone, or both. When the methods of this invention are utilized to resin coat and consolidate particulate solids already in a subterranean zone, the following steps are performed. A hardenable resin composition is prepared comprised of a hardenable organic resin, an aminosilane resin-to-particulate solid coupling agent, a viscous carrier fluid breaker for breaking the above mentioned viscous carrier fluid films whereby the particulate solids contact each other and a surface active agent for causing the resin composition to flow to the contact points between the particulate solids. The particulate solids are coated with the hardenable resin composition, and the resin composition is then allowed to harden and consolidate the particulate solids in the zone.

The uncoated particulate solids in the subterranean zone are coated with the hardenable resin composition of this invention by contacting the particulate solids in the zone with the resin composition whereby the resin composition coats onto the particulate solids. Thereafter, the resin composition is caused to harden as a result of being heated in the subterranean zone or as a result of the presence of an internal hardening agent in the resin composition.

When the carrier fluid is utilized to carry resin composition coated particulate solids into the subterranean zone, the carrier fluid containing the coated solids is pumped into the zone by way of the well bore penetrating it. Generally, as the carrier fluid is pumped, uncoated particulate solids, such as sand, are combined with the carrier fluid followed by the hardenable resin composition. The hardenable resin composition coats onto the particulate solids while the solids and resin are being carried by the carrier fluid. After the resulting resin coated particulate solids are deposited in the subterranean zone, the resin hardens and consolidates the particulate solids into a permeable pack of high compressive strength as described above.

Thus, the methods of the present invention for consolidating particulate solids placed in a subterranean zone penetrated by a well bore when there is a lack of closure pressure or when the particulate resin coated solids are separated by films of unbroken viscous carrier fluid, or both, are basically comprised of the following steps. A hardenable resin composition is prepared comprised of a hardenable organic resin, an aminosilane resin-to-particulate solid coupling agent, a viscous carrier fluid breaker for breaking the carrier fluid films and a surface active agent for causing the resin composition to flow to contact points between the particulate solids. The particulate solids are suspended in a carrier fluid followed by the introduction of the resin composition into the carrier fluid, and the suspended particulate solids are coated with the hardenable resin composition. The carrier fluid containing the resin coated particulate solids is pumped into the subterranean zone by way of the well bore and the resin coated particulate solids are deposited therein. Thereafter, the resin composition is allowed to harden and to consolidate the particulate solids in the subterranean zone into a permeable pack of high compressive strength.

In order to further illustrate the hardenable resin compositions and methods of this invention, the following examples are given.

EXAMPLE 1

A viscous carrier fluid was prepared in the laboratory by mixing deionized water containing 7% by weight potassium chloride with hydroxyethylcellulose in an amount to make an aqueous gelled solution having a concentration of 40 pounds of hydroxyethyl-cellulose per 1,000 gallons of water.

The pH of the aqueous gel was adjusted to 6.5 with acetic acid and mixed for 5 minutes. Thereafter, the pH was adjusted to 12 with a sodium hydroxide solution.

Test No. 1

To a 250 milliliter sample of the above described aqueous gel, 250 grams of 20–40 mesh (U.S. Sieve Series) sand coated with a resin composition was added to the aqueous gel sample. A gel cross-linker comprised of a mixture of sodium borate and sodium hydroxide was added to the aqueous gel containing the resin coated sand and the mixture was stirred for 5 minutes. Thereafter, the mixture was heated in a water bath at 200° F. for 30 minutes with occasional stirring followed by cooling to room temperature. The mixture was then placed in a sealed bottle which was maintained at 200° F. in an oven overnight. The bottle was removed from the oven, cooled to room temperature and the compressive strength of the consolidated sand therein was determined using an Ultrasonic Cement Analyzer.

Test No. 2

The procedure of Test No. 1 was repeated in a second test except that the resin diluent utilized in the resin composition in Test No. 1 was omitted (see Table I below).

Test No. 3

The procedure of Test No. 1 was repeated a third time except that a different resin diluent was used (see Table I below).

Test No. 4

The procedure of Test No. 3 was repeated except that the ethoxylated nonyl phenol phosphate ester surfactant utilized in Test No. 3 was omitted (see Table I below).

Test No. 5

The test procedure of Test No. 4 was repeated except that the pH of the aqueous gel was lowered.

The identification of the components in the resin compositions tested, the amounts of the components and the results of Tests Nos. 1–5 are given in Table I below.

TABLE I

Compressive Strengths Of Various Resin Coated Sand Consolidations In Viscous Carrier Fluid And Without Closure Pressure

| Resin Composition Components | Resin Composition Component Amounts, % by weight of the composition | | | | |
|---|---|---|---|---|---|
| | Test 1 | Test 2 | Test 3 | Test 4 | Test 5 |
| Polyepoxide Resin[1] | 64 | 67.7 | 63.6 | 66.4 | 63.6 |
| Aromatic Hydrocarbon Resin Diluent[2] | 5.5 | — | — | — | — |
| Cyclohexane Dimethanol Resin Diluent | — | — | 6.1 | 6.4 | 6.1 |
| 2-ethyl, 4-methyl imidazole Hardening Agent | 21.7 | 23 | 21.5 | 22.5 | 21.5 |
| Surface Active Agent[3] | 4.3 | 4.5 | 4.3 | 0 | 4.3 |
| Methanol Diluent | 2.5 | 2.7 | 2.5 | 2.6 | 2.5 |
| N-2-(aminoethyl)-3-aminopropyltrimethoxysilane | 2 | 2.1 | 2 | 2.1 | 2 |
| RESIN COATED SAND CONSOLIDATION COMPRESSIVE STRENGTH, psi | 589 | 73 | 141 | 46 | 215 |

[1]Condensation product of epichlorohydrin and bisphenol A commercially available under the trade designation"EPON-828 ™" from the Shell Chemical Co.
[2]butyl lactate
[3]ethoxylated nonyl phenol phosphate ester From Table I, it can be seen that utilizing resin compositions without a resin diluent or a different resin diluent or changing the pH of the gelled and cross-linked mixture did not improve the compressive strengths of the resin coated sand consolidations after hardening of the resins.

EXAMPLE 2

Test No. 6

The procedure described in Example 1, Test No. 1 was repeated except that the resin composition did not include a resin diluent. Instead, a temperature activated breaker comprised of a 70% aqueous solution of sorbitol was added to the resin composition.

Test No.7

The procedure of Test No. 6 was repeated except that instead of the sorbitol temperature activated breaker, a catechol temperature activated breaker was included in the resin composition (see Table II below).

Test No. 8

The procedure of Test No. 7 was repeated except that a smaller amount of catechol was included in the resin composition (see Table II below).

Test No. 9

The procedure of Test No. 6 was repeated except that a smaller amount of the aqueous sorbitol solution was included in the resin composition (see Table II below).

Test No. 10

The procedure of Test No. 9 was repeated except that sorbitol was added to the resin composition as a solid.

Test No. 11

The procedure of Test No. 10 was repeated except that a temperature activated breaker comprised of a mixture of dimethyl glutarate, dimethyl succinate and dimethyl adipate was substituted for the solid sorbitol temperature actuated breaker.

The identification of the components in the resin compositions tested, the amounts of the components and the results of Tests Nos. 6–11 are given in Table II below.

vated breaker mixture was used and butyl alcohol was substituted for methanol.

Test No. 13

Test No. 13 was identical to Test No. 12 except that dimethyl glutarate dissolved in methyl alcohol was substituted for the butyl alcohol and temperature activated breaker mixture of Test No. 12 (see Table III below).

Test No. 14

Test No. 14 was identical to Test No. 13 except that dimethyl glutarate dissolved in butyl alcohol was substituted for the dimethyl glutarate dissolved in methanol (see Table III below).

TABLE II

Compressive Strengths of Various Resin Coated Sand Consolidations In Viscous Carrier Fluid And Without Closure Pressure

| Resin Composition Components | Resin Composition Component Amounts, % by weight of the composition | | | | | |
|---|---|---|---|---|---|---|
| | Test 6 | Test 7 | Test 8 | Test 9 | Test 10 | Test 11 |
| Polyepoxide Resin[1] | 61.5 | 64.2 | 66.1 | 64 | 65 | 66.1 |
| 2-ethyl, 4-methyl imidazole Hardening Agent | 21.1 | 22 | 22.7 | 21.9 | 22.3 | 22.7 |
| Surface Active Agent[2] | 5.8 | 6 | 6.2 | 6 | 6.1 | 6.2 |
| Methanol Diluent | 2.4 | 2.5 | 2.6 | 2.5 | 2.6 | 2.6 |
| N-2-(aminoethyl)-3-aminopropyltrimethoxysilane | 1.9 | 2 | 2 | 2 | 2 | 2 |
| Sorbitol (70% Aqueous Solution) Temperature Activated Breaker | 7.2 | — | — | 3.7 | — | — |
| Catechol Temperature Activated Breaker | — | 3.2 | 0.3 | — | — | — |
| Sorbitol (Particulate Solid) | — | — | — | — | 2 | — |
| Mixture of Dimethyl Glutarate, Dimethyl Succinate and Dimethyl Adipate | — | — | — | — | — | 0.4 |
| RESIN COATED CONSOLIDATION COMPRESSIVE STRENGTH, psi | 1744 | 2840 | 1214 | 834 | 1093 | 1728 |

[1]Condensation product of epichlrohydrin and bisphenol A commercially available under the trade designation "EPON-828 ™" from the Shell Chemical Co.
[2]ethoxylated nonyl phenol phosphate ester From Table II, it can be seen that when the resin compositions included the various temperature activated breakers tested, the consolidated resin coated sand packs produced had considerably higher compressive strengths than those of Example 1.

EXAMPLE 3

Test No. 12

The procedure of Test No. 11 of Example 2 was repeated except that an increased quantity of the temperature acti-

Test No. 15

Test No. 15 was identical to Test No. 14 except that sorbitol was substituted for the dimethyl glutarate (see Table III below).

The resin composition components, the amounts of the components and the results of Tests Nos. 12–15 are given in Table III below.

TABLE III

Compressive Strengths Of Various Resin Coated Sand Consolidations In Viscous Carrier Fluid And Without Closure Pressure

| Resin Composition Components | Resin Composition Component Amounts, % by weight of the composition | | | |
|---|---|---|---|---|
| | Test 12 | Test 13 | Test 14 | Test 15 |
| Polyepoxide Resin[1] | 62.6 | 65.6 | 62.6 | 62 |
| 2-ethyl, 4-methyl imidazole Hardening Agent | 21.4 | 22.5 | 21.4 | 21.2 |
| Surface Active Agent[2] | 5.9 | 6.2 | 5.9 | 5.8 |
| Methanol Diluent | — | 2.6 | - | — |
| Butyl Alcohol Diluent | 7.2 | — | 7.2 | 7.1 |
| N-2-(aminoethyl)-3-aminopropyltrimethoxysilane | 1.9 | 2 | 1.9 | 1.9 |

TABLE III-continued

Compressive Strengths Of Various Resin Coated Sand Consolidations In Viscous Carrier Fluid And Without Closure Pressure

| Resin Composition Components | Resin Composition Component Amounts, % by weight of the composition | | | |
|---|---|---|---|---|
| | Test 12 | Test 13 | Test 14 | Test 15 |
| Mixture of Dimethyl Glutarate, Dimethyl Succinate and Dimethyl Adipate | 1 | — | — | — |
| Dimethyl Glutarate in Methanol | — | 1.1 | — | — |
| Dimethyl Glutarate in Butyl Alcohol | — | — | 1 | — |
| Sorbitol (Particulate Solid) | — | — | — | 1.9 |
| RESIN COATED CONSOLIDATION COMPRESSIVE STRENGTH, psi | 1547 | 1929 | 2387 | 2140 |

[1]Condensation product of epichlorohydrin and bisphenol A commercially available under the trade designation "EPON-828 ™" from the Shell Chemical Co.
[2]ethoxylated nonyl phenol phosphate ester From Table III, it can be seen that the resin compositions of this invention tested in Tests Nos. 12–15 achieved resin coated sand consolidations of excellent compressive strengths and that the test composition which including the dimethyl glutarate and butyl alcohol temperature activated breaker (Test No. 14) achieved the best results.

Thus, the present invention is well adapted to attain the objects and advantages mentioned as well as those which are inherent therein. While numerous changes may be made by those skilled in the art, such changes are encompassed within the spirit of this invention as defined by the appended claims.

What is claimed is:

1. A method of consolidating particulate solids in a subterranean zone penetrated by a wellbore when there is a lack of closure pressure exerted on the particulate solids in the zone or when the particulate solids are seperated by films of unbroken viscous carrier fluid in the zone, or both, comprising the steps of:
    (a) preparing a hardenable resin composition comprised of a hardenable organic resin, an aminosilane resin-to-particulate solid coupling agent, a viscous carrier fluid breaker for breaking said carrier fluid films and a surface active agent for causing said resin composition to flow to contact points between said particulate solids;
    (b) injecting said composition prepared in step (a) into said subterranean zone and coating said particulate solids present therein with said hardenable resin composition prepared in step (a); and
    (c) allowing said resin composition to harden and consolidate said particulate solids in said zone into a permeable pack of high compressive strength.

2. The method of claim 1 wherein said resin composition further comprises an internal hardening agent for said resin.

3. The method of claim 1 wherein said hardenable organic resin in said composition is selected from the group consisting of polyepoxide resins, novolak resins, polyester resins, phenol-aldehyde resins, urea-aldehyde resins, furan resins, urethane resins and mixtures thereof.

4. The method of claim 2 wherein said internal hardening agent in said composition is selected from the group consisting of amines, amides, hexachloroacetone, 1,1,3-trichlorotrifluoroacetone, benzotrichloride, benzylchloride and benzalchloride.

5. The method of claim 1 wherein said aminosilane coupling agent in said composition is selected from the group consisting of 3-aminopropyltrimethoxysilane, 3-aminopropyltriethoxysilane, N-2-(aminoethyl)-3-aminopropyltrimethoxysilane and 3-glycidoxypropyltrimethoxysilane.

6. The method of claim 1 wherein said viscous carrier fluid breaker in said composition is a temperature activated breaker selected from the group consisting of sorbitol, catechol, dimethyl glutarate dissolved in an alcohol and a mixture of dimethyl glutarate, dimethyl succinate and dimethyl adipate.

7. The method of claim 1 wherein said surface active agent in said composition is ethoxylated nonyl phenol phosphate ester.

8. The method of claim 1 wherein said composition further comprises a viscosity reducing diluent selected from the group consisting of methanol and butyl alcohol.

9. A method of consolidating particulate solids placed in a subterranean zone penetrated by a well bore when there is a lack of closure pressure exerted on the particulate solids in the zone or when the particulate solids are separated by films of an unbroken viscous carrier fluid in the zone, or both, comprising the steps of:
    (a) preparing a hardenable resin composition comprised of a hardenable organic resin, an aminosilane resin-to-particulate solid coupling agent, a viscous carrier fluid breaker for breaking said carrier fluid films and a surface active agent for causing said resin composition to flow to contact points between said particulate solids;
    (b) suspending said particulate solids in a viscous carrier fluid;
    (c) coating said particulate solids with said hardenable resin composition prepared in step (a);
    (d) pumping said carrier fluid containing resin coated particulate solids into said zone by way of said well bore and depositing said resin coated particulate solids therein; and
    (e) allowing said resin composition to harden and consolidate said particulate solids in said zone into a permeable pack of high compressive strength.

10. The method of claim 9 wherein said viscous carrier fluid is comprised of water and a gelling agent.

11. The method of claim 10 wherein said viscous carrier fluid further comprises a cross-linking agent for said gelling agent.

12. The method of claim 10 wherein said gelling agent is selected from the group consisting of guar, guar derivatives and cellulose derivatives.

13. The method of claim 11 wherein said cross-linking agent is selected from the group consisting of borates, borax, boric acid and compounds capable of releasing multivalent metal ions in aqueous solutions.

14. The method of claim 9 wherein said resin composition further comprises an internal hardening agent.

15. The method of claim 9 wherein said hardenable organic resin in said composition is selected from the group consisting of polyepoxide resins, novolak resins, polyester resins, phenol-aldehyde resins, urea-aldehyde resins, furan resins, urethane resins and mixtures thereof.

16. The method of claim 14 wherein said hardening agent in said composition is selected from the group consisting of amines, polyamines, amides, polyamides, hexachloroacetone, 1,1,3-trichlorotrifluoroacetone, benzotrichloride, benzylchloride and benzalchloride.

17. The method of claim 9 wherein said aminosilane coupling agent in said composition is selected from the group consisting of 3-aminopropyltrimethoxysilane, 3-aminopropyltriethoxysilane, N-2-(aminoethyl)-3-aminopropyltrimethoxysilane and 3-glycidoxypropyltrimethoxysilane.

18. The method of claim 9 wherein said viscous carrier fluid breaker in said composition is a temperature activated breaker selected from the group consisting of sorbitol, catechol, dimethyl glutarate dissolved in an alcohol and a mixture of dimethyl glutarate, dimethyl succinate and dimethyl adipate.

19. The method of claim 9 wherein said surface active agent in said composition is ethoxylated nonyl phenol phosphate ester.

20. The method of claim 9 wherein said composition further comprises a viscosity reducing diluent selected from the group consisting of methanol and butyl alcohol.

* * * * *